Dec. 25, 1945.  E. HEUER  2,391,624

STUD BOLT RETRACTOR AND DRIVE

Filed Oct. 7, 1943

*Ernest Heuer,*
INVENTOR.

BY *Victor J. Evans & Co.*
ATTORNEYS

Patented Dec. 25, 1945

2,391,624

UNITED STATES PATENT OFFICE 2,391,624

STUD BOLT RETRACTOR AND DRIVE

Ernest Heuer, Vallejo, Calif.

Application October 7, 1943, Serial No. 505,339

1 Claim. (Cl. 81—53)

My invention relates to stud bolts and the like, and has among its objects and advantages the provision of an improved stud bolt remover and driver.

Figure 1:
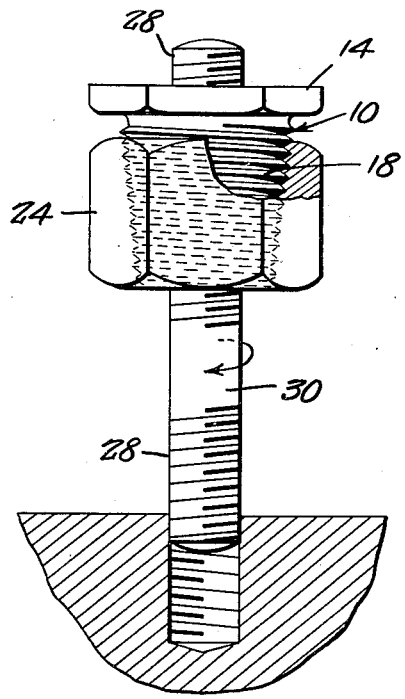
Figure 1 is a view illustrating the invention applied to a stud bolt for driving purposes.

In the embodiment selected for illustration, I make use of two jaws 10 and 12. Each jaw includes a nut flange 14 and a tapered semicircular body 16 provided with externally tapered threads 18. Each jaw is provided with a semicircular groove 20 having stud gripping ribs 22 extending longitudinally of the groove.

The jaws 10 and 12 are identical in construction with the exception that the ribs 22 in the jaw 10 are tangentially inclined in one direction while the ribs in the jaw 12 are tangentially inclined in the opposite direction.

Coacting with the jaws 10 and 12 is a nut 24 internally threaded at 26 for coaction with the threads 18. Threads 18 and 26 are of the left hand type. In any event, the threads 18 and 26 are reversed with respect to the threads 28 on the stud 30.

In operation, the grooves 20 are shaped to fit studs of predetermined diameters. The jaws are applied to the stud and clamped thereto by threading the nut 24 onto the jaws. Figure 1 illustrates the jaws clamped to the outer end of the stud 30 for threading the stud home. A wrench is applied to the nut 24 for turning the stud. A wrench may also be applied to the jaws 10 and 12 to restrain the jaws from rotation as the nut 24 is being threaded tightly on the jaws. Since the threads 18 and 26 are reversed with respect to the threads 28, increased resistance to rotation of the stud 30 increases the clamping relationship between the jaws 10 and 12, so that a firm clamp connection is maintained between the jaws and the stud.

Figure 2:
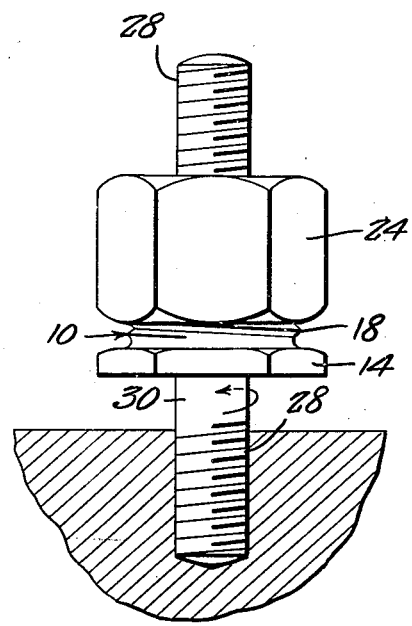
Figure 2 is a view illustrating removal of the stud bolt.
Figure 3:
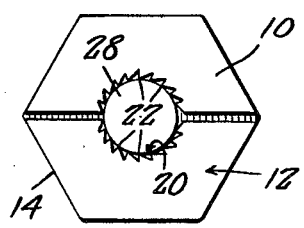
Figure 3 is an end view of a pair of stud bolt clamping jaws.
Figure 4:
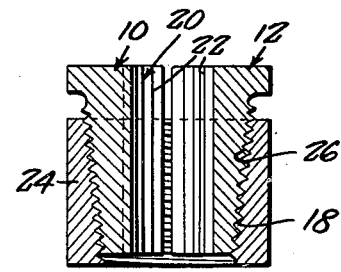
Figure 4 is a sectional view of the jaw and the jaw clamping nut.
Figure 5:
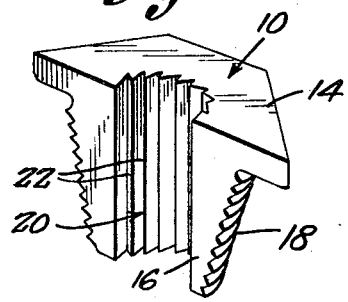
Figure 5 is a perspective view of one of the jaws.

For stud removing purposes, the nut and the jaws are reversed, as in Figure 2, so that counter-clockwise rotation of the stud through the medium of the nut 24 causes the latter to clamp the jaws firmly to the stud. The grooves 20 are curved through slightly less than one hundred and eighty degrees so that a space is provided between the two jaws for a stud of given diameter to insure firm clamping engagement between the jaws and the stud. A firm gripping action is attained regardless of direction of rotation through the reverse arrangement of the two sets of ribs 22.

Without further elaboration, the foregoing will so fully illustrate my invention, that others may, by applying current knowledge, readily adapt the same for use under various conditions of service.

I claim:

A stud bolt applying and removing device, comprising jaws cooperating with each other to form a gripper externally tapered towards one end and externally threaded, the external threads of said jaws being pitched in a direction opposite to the pitch of threads of a stud bolt to be turned, a nut having a tapered bore for accommodating said gripper, said nut being internally threaded and screwed upon the gripper from the small end thereof for urging the jaws towards each other and binding the jaws about the stud bolt, said jaws being formed at their inner sides with opposed longitudinally extending transversely arcuate grooves cooperating to form a bore for receiving the stud bolt, each jaw having flat inner side faces at opposite sides of its groove, the grooves each having its wall transversely arcuate less than 180° to space the inner sides of the jaws from each other when the jaws are disposed about a stud bolt, said jaws having outstanding laterally extending flanges at the large end of the gripper for engagement by a wrench for holding the jaws stationary while tightening the nut, and ribs for gripping the stud bolt extending longitudinally of walls of the grooves, the ribs of each jaw being pitched transversely of the jaw in a direction opposite to the pitch of the ribs of the other jaw.

ERNEST HEUER.